July 26, 1966  J. P. WESTERWEEL  3,263,073
ELECTRONIC RAILWAY EQUIPMENT
Filed July 27, 1962  5 Sheets-Sheet 1

Inventor
Jacobus P. Westerweel
By Cushman, Darby & Cushman
Attorneys

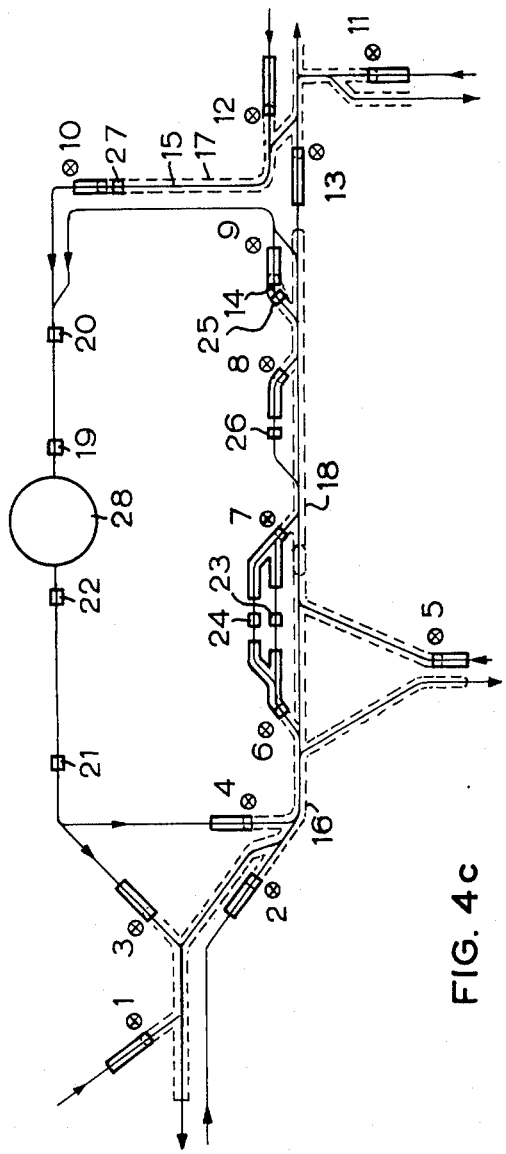
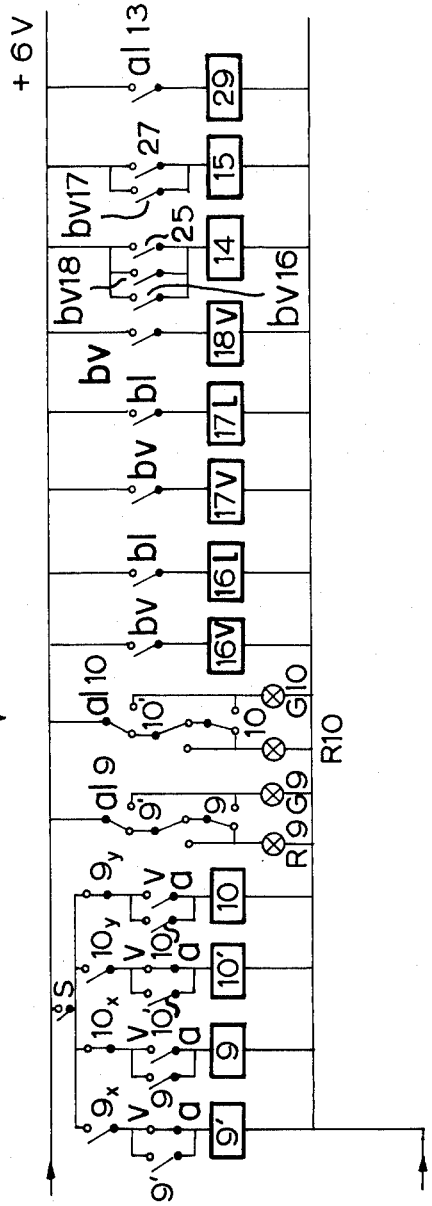
FIG. 3
FIG. 4c

July 26, 1966  J. P. WESTERWEEL  3,263,073
ELECTRONIC RAILWAY EQUIPMENT
Filed July 27, 1962  5 Sheets-Sheet 5

Inventor
Jacobus P. Westerweel
By Cushman, Darby & Cushman
Attorneys

United States Patent Office 3,263,073
Patented July 26, 1966

3,263,073
ELECTRONIC RAILWAY EQUIPMENT
Jacobus P. Westerweel, Brunssum, Netherlands, assignor to Stamicarbon N.V., Heerlen, Netherlands
Filed July 27, 1962, Ser. No. 212,987
Claims priority, application Netherlands, July 27, 1961, 267,646
8 Claims. (Cl. 246—30)

The present invention relates to electronic railway equipment comprising a loop antenna arranged parallel to the track. The antenna may be used, for instance, for receiving waves from a transmitter placed on a locomotive.

The invention provides a number of loop antennae belonging each to a different section of the railway network, the connection being so arranged that, when a train arrives at, or passes, an antenna, the control of the signal devices, traffic regulation devices, train-handling installations, or the like, depends on right-of-way rules that are bound up with the presence, the nature, the length and/or the destination both of this train and of trains that may be present at other antennae.

Consequently, the railway network can be divided into sections, which are each provided with an antenna and are limited by traffic lights, the arrangement being such that, under normal circumstances, only one train at a time can be in a section, if the traffic rules are observed. This application consequently relates to the so-called block-system.

It is also possible to regulate the traffic at points automatically by providing a loop antenna at each leading-in track and by giving right of way to the train arriving first, or, if trains approach along different tracks, by giving right of way for instance to empty trains.

It is preferred to have a system in which the transmitters of the trains can be made to work at various frequencies at will, the choice of the frequency selected for each particular type of train in the system also determining whether any signalling and other devices, and if so, which, will be operated. By means of these frequencies it is possible to indicate the nature (full train, separate locomotive, etc.), the destination, or similar information which may influence the operation of certain signals, points, uncoupling devices, etc.

If the ends of two adjacent loop antennae are made overlapping one on the other, a relay which is responsive to the first antenna and is excited by the passing train will remain excited when the train passes on to the overlap, the train thereby also influencing the second antenna. This will allow the second antenna to assume the task of the first antenna and will also be effective as a memory function as to the origin of the passing train, which of course becomes an important consideration when the ultimate desination and function of the train is to be determined.

It is to be recommended that at a railway junction formed by one or a number of closely adjacent points, crossings and the like, at least one so-called engaged-signal antenna be fitted, and, for each leading-in track, one so-called announcing-signal antenna, which forms the abovementioned antenna passed first for each leading-in track, and that the connection be so arranged that all-clear signals can only be given simultaneously at those announcing-signal antennae whose trains cannot hinder each other's passage. The latter can be achieved by providing such a relay connection for a signal device that upon excitation of the relay the danger signal changes into an all-clear signal, there being series-connected in the circuit of the relay an operating contact, which can be controlled by the receiver of the announcing-signal antenna, and, if so desired, one or more rest contacts, which can be controlled each by the relay of the signal device belonging to another announcing-signal antenna, while, parallel to the contact that can be controlled by the receiver of the announcing-signal antenna, an operating contact is arranged that can be controlled by the receiver of an engaged-signal antenna.

By preference, the relays have different and, if so desired, adjustable responding times. If two relays with different responding times are excited simultaneously, they will both drop out immediately, after which the relay with the shortest responding time first responds again, rendering excitation of the other relay impossible.

The invention is highly important for the railway network near the shaft in the underground workings of a mine, one or more engaged-signal antennae being preferably provided at by-pass and/or waiting tracks. Since a railway network of this type is situated in galleries with many bends, a more complicated situation is unthinkable. Up to now a great number of people have been necessary to regulate this traffic, important tracks being not infrequently blocked for a long time by waiting trains. If the invention is applied, the trains wait their turn at the announcing-signal antennae outside the railway centre; it appeared that the total waiting time of all trains together could be considerably reduced, and, thanks to the possibility of automatic selection, especially the waiting time of the most important transport; this is usually the transport of empty cars from the shaft to the coal-face, as a failure in the supply of empty cars may result in stagnation of the coal production. It is likewise important that there are always full cars at the shaft, and also, to mention only one thing, that separate locomotives can easily reach all parts of the network where cars are stationed.

A contemplated solution for the abovementioned traffic congestion problem, is to have a portion of the track system operable as a waiting track and another as a train-formation track, with means located thereon or nearby which are car detectors and/or car counting devices. These devices will enable the train-formation track section to control the number of trains coming in to the shaft by generating an all-clear signal to a waiting train. The signal, so generated, will therefore be partly dependent on the number of cars present at a given moment on the train-formation track near the shaft.

There can be more than one waiting track which feeds the train-formation track, however, the invention further contemplates that an announcing signal antenna be provided at the waiting track ends which leads into the train formation track, so that they can efficiently allow the trains on the waiting tracks to be admitted onto the formation track. The relays of the announcing signal antennae are so interconnected with the detecting and counting devices located at or on the formation track so that only when a train can be efficiently allowed to be moved, will the relays allow the waiting train to move. The train then is admitted to the formation track, and the detecting and counting devices in combination with the relays of the announcing signal antennae, will once again resume control of the waiting track signal, until another waiting train can be efficiently moved to the formation track.

The invention will be elucidated with reference to the drawing, in which an embodiment is shown.

FIG. 3 shows a railway network near the shaft in the underground workings of a coal-mine, with announcing-signal and engaged-signal antennae.

Figures 5, 6:
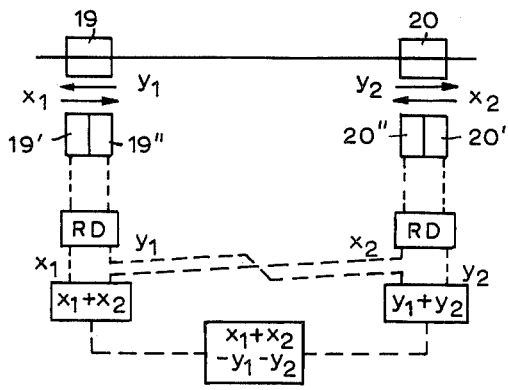

FIG. 5 serves to elucidate the principle of an appurtenant counting device.

FIG. 6 gives a survey of the safety-system according to FIGS. 3 and 4.

A locomotive 30 (FIG. 1) is fitted with a transmitter 31 and a ferrite antenna 32. Between the rails 33 a loop antenna 34 is mounted which is connected to a receiver 35. A voltage is excited in loop antenna 34 with a frequency equal to the transmitter frequency. After amp'ification, this voltage excites a relay (e.g. 34*l*), as a result of which a contact *al*34 is closed. As long as the locomotive is over the antenna, the contact remains closed. The frequency on the locomotive can be changed by means of a switch (not shown). The position of the switch determines which relay is excited; to this end the receiver is provided with filters (not shown), e.g. LC filter circuits located in the receiver. If a certain relay is closed, this indicates the presence of the train, and gives one other piece of information, e.g. the nature, origin, destination, or the like, of the train. It is also possible that a relay is excited for communication purposes. In the embodiment described in this specification use is made of two frequencies only. One frequency is used for detecting full cars, and one for detecting other traffic, such as empty cars, man-riding trains, separate locomotives, etc. These two distinctions are indicated in the drawing and the specification by *v* and *l*.

Figure 2:
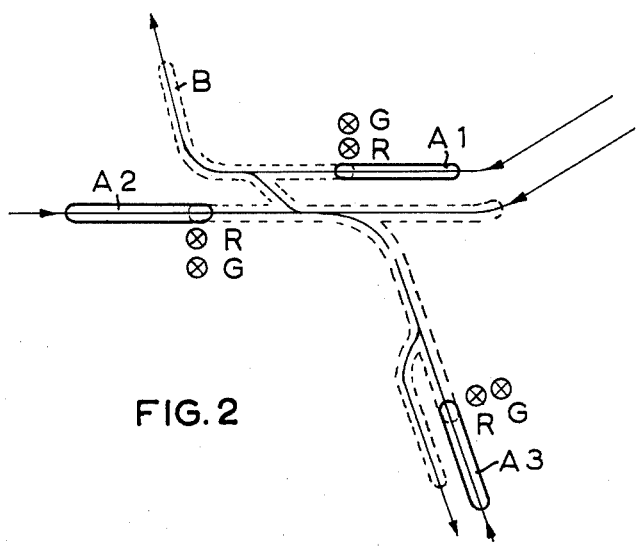
FIG. 2 shows a railway junction with an engaged-signal antenna and a few announcing-signal antennae.

FIG. 2 shows a railway junction provided with a so-called engaged-signal antenna B. Coupled to this antenna by overlap are so-called announcing-signal antennae (A1, 2 and 3). At the overlaps traffic lights are placed (R=red; G=green). The direction of the traffic is indicated by arrows. The traffic lights are normally red; if a train arrives over one of the announcing-signal antennae, a certain announcing relay is excited, dependent on the nature of the train. The connection is so arranged that it is automatically examined:

(1) In the case of full trains, whether the railway junction and/or a subsequent waiting track is engaged. If this is not the case, the traffic light changes to green and the train can pass the railway junction. If one of the two is engaged, the traffic light remains red and the train has to wait outside the railway junction.

(2) In the case of empty trains (man-riding train, etc.), whether the railway junction is engaged. If this is not the case, the traffic light changes to green and the train can pass. The waiting tracks are only for full trains. If the railway junction is engaged, the train has to wait until an earlier train has left the engaged-signal antenna.

If a number of trains at a time are waiting before an engaged railway junction, the connection provides for empty trains to be given right of way by full trains.

If trains with the same destination are waiting at the same time, priority is given to the track with the densest traffic. As long as a waiting track is occupied, this must be indicated, even if the locomotive is uncoupled and driven away. On waiting tracks, and also on formation tracks, the presence of the cars themselves is therefore detected, all as fully explained below in connection with FIG. 5.

In FIG. 3 reference numbers 1–13 represent announcing-signal antennae, which are linked to engaged-signal antennae 16, 17 and 18. Antennae 9 and 10 have a slightly different position and function; they follow engaged-signal antennae, whereas the other announcing-signal antennae are followed by engaged-signal antennae. The same reference numbers 1–13 are used to indicate the traffic lights R and G (shown as one in FIG. 3) and the appurtenant relays (numbered rectangles in FIGS. 4*a*, *b* and *c*). Waiting tracks and their relays are indicated by 14 and 15. Detection and counting devices 19–22 are fitted in the formation tracks before and after the shaft 28. In addition, car-detection devices 23–27 are provided. Car detection itself can be accomplished in any known way, e.g., magnetically, mechanically, optically, etc. 29 (FIGURE 4*c*) indicates a relay, which is excited via antenna 13. A full explanation of the system can be obtained by an understanding of the exemplary operations set out below.

Full cars destined for the shaft can be directed to the shaft via the announcing-signal antennae 1, 2, 5, 11 and 12. The full cars can also come from the bunker tracks, via antennae 7 and 8. The cars reach shaft 28 via the waiting tracks 14 and 15 and a formation track at 19–20. Empty cars can leave the junction in various directions via a formation track at 21, 22 and the announcing-signal antennae 3 and 4.

Figure 1:
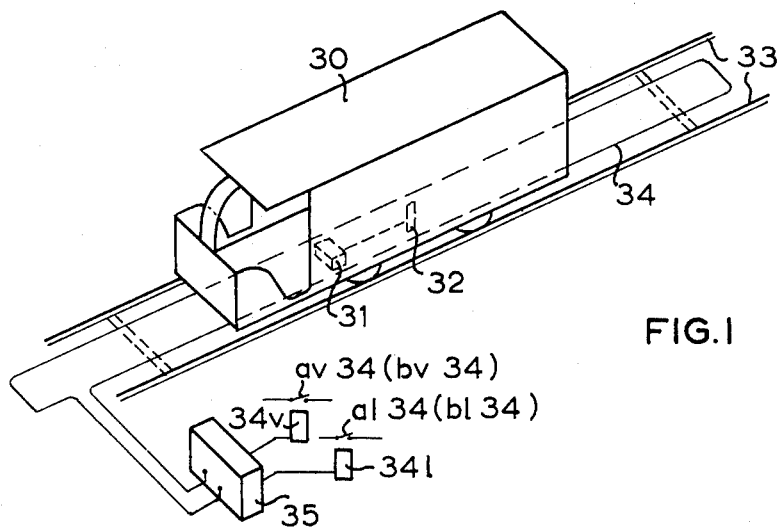
FIG. 1 shows a locomotive with a transmitter, and a loop antenna with a receiver.
Figure 4A:
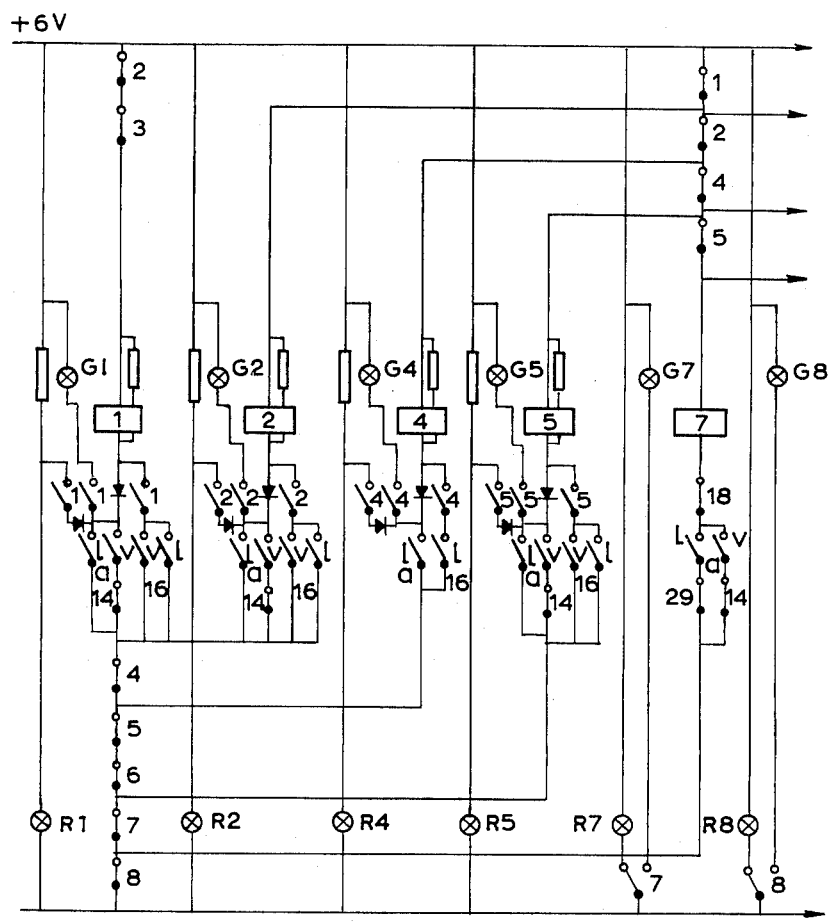
FIG. 4 (a, b, and c) shows the appurtenant relay-connection diagram.
Figure 4B:
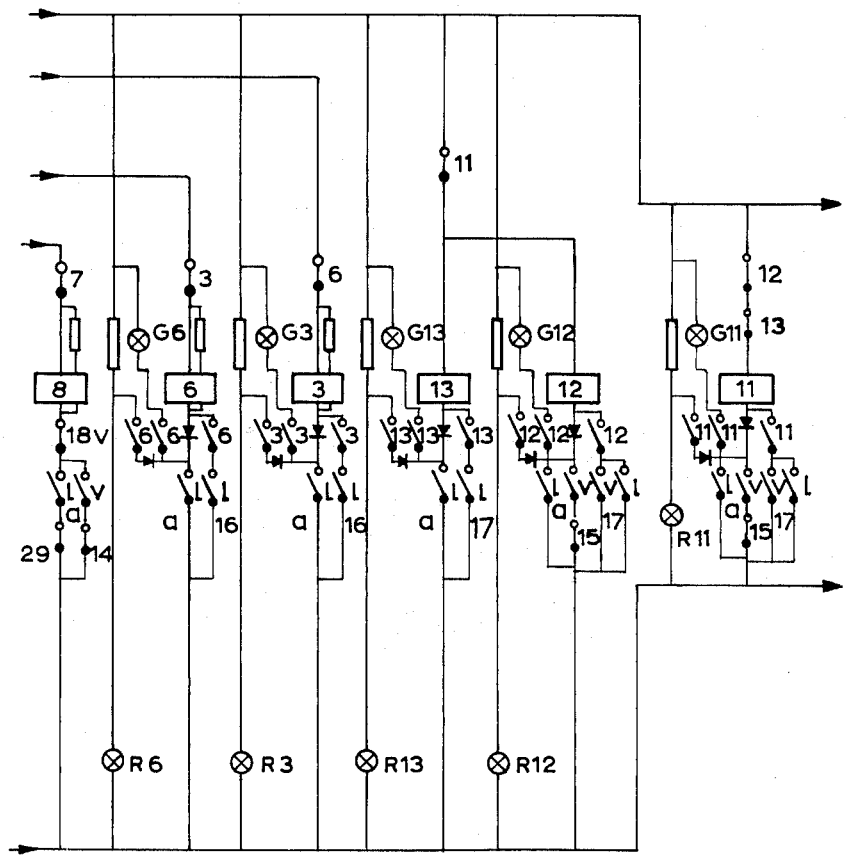

If, for instance, a separate locomotive enters the announcing-signal antenna 1, a relay (not shown), which, by analogy, would have to be indicated by 1*l* in FIG. 1, is excited, as a result of which contact *al* is closed, which is indicated in FIG. 4*a* under relay 1. If all contacts 2–8 in the circuit of relay 1 are closed, which is the case if the relays 2–8 are not excited, relay 1 is excited. As a result the three 1 contacts under relay 1 are closed and the contact 1 over relay 7 is opened by relay 1. This means that the FIGS. 4*a* and 4*b* relays 2, 3, 4, 5, 6, and 7 cannot be excited. Lamp R1 is short-circuited, by the left relay contact 1, the diode shown, and relay contacts 4–8 in the relay 1 circuit; and green lamp G1 lights up by virtue of the closing of the middle relay contact 1 in that circuit; the locomotive can pass, and enters the engaged-signal antenna 16. Contact *bl* is now closed, as a result of which relay 16 is excited. In consequence, the contact 16*l* under the relays 1 and 2–6 are closed; however, only the contact under relay 1 is of importance. This contact ensures that relay 1 remains excited as long as the locomotive is at the engaged-signal antenna 16. At the overlap of announcing-signal antenna 1 and engaged-signal antenna 16, contact *al* of relay 1*l* remained closed, so that the engaged-signal antenna 16 could take over the task of the announcing-signal antenna 1. After the overlap has been passed, contact *al* of relay 1*l* is opened, so that lamp R1 re-lights and lamp G1 is extinguished.

If, instead of the locomotive in announcing-signal loop antenna 1, a train should have entered announcing-signal antenna 3, it is evident from the diagram of FIGS. 4*a* and *b* that this train can only be hindered by the announcing-signal antennae 1 and 6. If trains arrive simultaneously at antennae 1, 3 and 6, a certain priority can be established by setting the relays to different responding times. This can be effected for instance by imparting a different value for each relay to the resistance which is series-connected to an auxiliary winding that provides for a current dependent responding time; by reversing the connection of the auxiliary winding, the retarded action can be replaced by an accelerated action, and the other way about.

If a full train enters loop antenna 9, contact *av* closes and relay 9 is excited (FIG. 4*c*), provided that contacts 10 and S are closed. Contact S is closed by counter 19, 20 in the formation track before the shaft when less than a given number of cars are in this track. Contact 9 closes, as a result of which relay 9 remains excited, even if contact *av* is opened. In consequence of the excitation of relay 9 lamp R9 is extinguished and lamp G9 is lit, via the contacts *al*9, 9' and 9. The train subsequently moves on to the shaft and leaves therefore antenna 9. As a result contact *av* in the circuit of relay 9' is closed (this contact was opened when the train entered loop antenna 9) so that relay 9' is excited. Lamp G9 is again extinguished and lamp R9 lights up again. Not until the train is on the formation track 19, 20, is contact S re-opened, cutting out relays 9 and 9'. Not until then can relay 10 be excited, provided, however, that contact S has first been re-closed. Switches 9*x* and 9*y*; and 10*x* and 10*y* are respectively oppositely controlled switches, when one is open the other is closed.

Relay 14 is excited if at least one of the FIG. 4*c* contacts *bv*16, *bv*18 and 25 is closed, which is the case if a full train is present in one of the engaged-signal loop antennae 16 and 18, or in antenna 9. When a train is present in antenna 9, contact 25 will be closed by the car detection device 25 (FIGURE 3). If relay 14 is excited, relays 1, 2, 5, 7, and 8 cannot be excited by a full train. Consequently, it is impossible that a full train cannot move as far as waiting track 14. For example, a full train having reached loop 16 for instance, can no more be hindered by other trains, and reaches the waiting track 14 as soon as possible, so that the track is free again in a short time.

If an empty train enters the announcing-signal antenna 13, relay 29 is excited. Now it is impossible for relays 7 and 8 to be excited by an empty train since the normally closed relay contacts 29 in the circuits of relays 7 and 8 are now open.

The connection diagram has been sufficiently elucidated by these examples to enable safety and control connections to be understood in other situations.

The principle of a counting device, e.g. 19, 20 (FIGS. 3 and 5), is as follows.

Cars can enter the track section between the detection devices 19 and 20 in the directions indicated by arrows $x_1$ and $x_2$; the directions in which the cars leave the section are indicated by the arrows $y_1$ and $y_2$. By means of a sequence connection each detection device can react to the direction of travel of the cars. Detection devices 19 and 20 respectively include the exit and enter counter devices 19', 20' and 19" and 20" along with the direction detectors RD and the adders and subtractor shown in FIG. 5. If device 19' receives an impulse before device 19", the direction detector RD passes on an impulse $x_1$; in the reverse case an impulse $y_1$ is passed on.

In a similar way detection device 20 passes on impulses $x_2$ and $y_2$. The impulses $x_1$ and $x_2$ (arrival) are added up, as are the impulses $y_1$ and $y_2$ (departure). The difference between the two results is the number of cars between the detection devices 19 and 20.

If the track section is fully occupied, no cars can be admitted, as contact S (FIG. 4c, relays 9 and 10) cannot be closed. However, if the difference between counts by the detection devices 19 and 20 is less than a given number, such as full occupancy for example, switch S will be closed.

FIG. 6 gives a survey of the safety and control devices according to the diagram of FIG. 4. Again, the reference numbers 1-13 indicate the announcing-signal antennae; the letters W.S. refer to waiting tracks (14 and 15); $v$ and $l$ stand for full and empty (separate locomotive, etc.). In normal circumstances there are no full trains over antennae 3, 4, 6 and 13, so the $v$ columns for these antennae have been omitted. Empty trains can enter antennae 9 and 10 (locomotives); however, contact $al9$ or $al10$ (see FIG. 4c) is then reversed, so that lamp G9 or G10 lights up. Thus, during long waits, e.g. at the end of the shift, the locomotives are always available.

The circles indicate cases which are incompatible as far as destination is concerned; thus a train on waiting track 14 prevents a full train in loop antennae 1, 2, 5, 7, and 8 from moving on. The crosses indicate cases which are incompatible as far as route is concerned; thus a full train in loop antenna 5 cannot move on if at the same time one of the following trains should move on: $1v$, $1l$, $2v$, $2l$, $4l$, $7v$, $7l$, $8v$ and $8l$. A full train in loop antenna 5, however, is not hindered by an empty train in loop antenna 3, in loop antenna 6, or in loop antennae 9-13. Two full trains cannot be present in loop antenna 5; neither can an empty and a full train be present in loop antenna 5.

Briefly, the diagram satisfies the following conditions:

(a) Trains must not endanger each other at railway junctions.

(b) When the waiting tracks, which are intended for full cars, are occupied, subsequent trains, if any, of full cars must be kept outside the loading station.

(c) When an originally occupied waiting track becomes free, it must be possible for a full train that may be waiting outside the loading station immediately to enter this waiting track, if the tracks to be passed are free.

(d) Trains of empty cars leaving for the face must have the least possible delay. Consequently, these trains must not be delayed at unoccupied railway junctions when the waiting track is occupied, as is the case with full trains.

(e) Separate locomotives, man-riding trains, etc. must not be delayed at unoccupied railway junctions, if the waiting track is occupied.

(f) It must be possible for a separate locomotive at all times to reach every point of the loading station.

(g) At all times the number of empty cars at the loading station must be known. Consequently, the cars on the formation track for empty cars at the exit side of the shaft must constantly be counted.

(h) At the entrance side of the shaft a counting device must constantly determine the number of cars on the formation track for full cars. If this number falls below a certain value (dependent on the shaft capacity and the distance from formation track to waiting track), full cars must be directed from the waiting track to the formation track at the command of this counting device.

The invention is not restricted to the embodiment described. Many applications can be conceived within the scope of the invention, also for surface railways, notably for shunting yards, whether or not combined with a communication system, with many more than two frequencies, etc.

I claim:

1. A railway traffic control system for automatically controlling the movement over given railway track of vehicles providing different signal transmissions for different characteristics associated with the particular vehicle at the time, comprising
at least one electrically operated device for regulating traffic on said track,
receiver means, including a plurality of loop antennae each stretching over a section of said track for respectively receiving a said transmission when one of said vehicles is opposite the receiving antenna, for providing a signal signifying the said characteristic associated with the vehicle whose transmission is received by the said opposite antenna,
means coupled to said receiver means for conjoint control of said traffic regulating device by the presence and absence of concurrent vehicle transmissions received by at least two of said loop antennae, wherein the ends of said adjacent loop antennae overlap, and
a relay, which is part of said conjoint control means and which has been excited by a loop antenna passed first by a vehicle, which remains excited when the train influences the following loop antenna, and remaining excited until the train leaves the overlap.

2. Railway control system according to claim 1 wherein said receiver means includes a receiver for each antenna and at least one said loop antenna is associated with a receiver which is differently responsive to signals of different frequency and the said conjoint control means causes the response of a said regulating device to simultaneous signals picked up by different antennae depend upon the relationship as to frequency of the different signals.

3. Railway control system according to claim 2 wherein said track includes a railway junction formed by at least one point, crossing, with the leading-in track at least one of said antennae being a so-called engaged-signal loop antenna fitted at said junction, and, for each leading-in track, another of said antennae being a so-called announcing-signal loop antenna, which forms the above mentioned loop antenna passed first for each leading-in track, there being a said traffic regulating device for each said leading-in track, and said conjoint control means being so arranged that all-clear signals from said said traffic regulating devices can only be given simultaneously at those announcing-signal loop antennae whose trains cannot hinder each other's passage.

4. Railway network near the shaft in the underground workings of a mine, provided with equipment according to claim 3 wherein at least one engaged-signal loop antenna is provided at by-pass and waiting tracks.

5. Railway network according to claim 4, including a vehicle counting device for preventing the lead-in of trains on at least one track.

6. Railway network according to claim 5, wherein the ends of waiting tracks, from which one formation track must be fed, are provided with announcing-signal loop antennae, the said conjoint control means including other relays which are so interconnected that only when cars can be admitted to the formation track, the blocking of one of the waiting tracks on which there is a train is discontinued under the influence of said counting device near the formation track until the train has left the said one waiting track.

7. Railway control system according to claim 3, wherein said conjoint control means includes a second relay connection for a said traffic regulating device so that upon excitation of the second relay the danger signal of said device changes into an all-clear signal, there being series-connected in the circuit of the relay an operating contact, which can be controlled by the receiver of the announcing-signal loop antenna associated with the said traffic regulating device connected to the second relay, and one or more rest contacts, which can be controlled each by the relay of the signal device belonging to another announcing-signal loop antenna, while, parallel to the contact that can be controlled by the receiver of the announcing-signal loop antenna, an operating contact is arranged that can be controlled by the receiver of the engaged-signal loop antenna.

8. Railway control system according to claim 7, wherein the relays have different responding times.

References Cited by the Examiner

UNITED STATES PATENTS

| | | | |
|---|---|---|---|
| 2,691,093 | 10/1954 | Chu | 246—63 X |
| 2,800,579 | 7/1957 | Martin | 246—2 |
| 2,916,612 | 12/1959 | Marple | 246—134 X |
| 3,008,041 | 11/1961 | Smith | 246—134 X |
| 3,054,100 | 9/1962 | Jones | 246—63 X |
| 3,054,890 | 9/1962 | Livingston | 246—134 |
| 3,077,164 | 2/1963 | Da Roza et al. | 246—2 X |
| 3,078,944 | 2/1963 | Gray. | |
| 3,202,816 | 8/1965 | Gregg | 246—63 |

ARTHUR L. LA POINT, *Primary Examiner.*

LEO QUACKENBUSH, *Examiner.*

S. B. GREEN, *Assistant Examiner.*